(12) United States Patent
Agam et al.

(10) Patent No.: US 7,787,711 B2
(45) Date of Patent: Aug. 31, 2010

(54) IMAGE-BASED INDEXING AND CLASSIFICATION IN IMAGE DATABASES

(75) Inventors: Gad Agam, Plainfield, IL (US); Ophir Frieder, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 1111 days.

(21) Appl. No.: 11/371,527

(22) Filed: Mar. 9, 2006

(65) Prior Publication Data

US 2007/0211964 A1 Sep. 13, 2007

(51) Int. Cl.
G06K 9/54 (2006.01)
G06K 9/66 (2006.01)
G06K 9/62 (2006.01)
H04N 1/00 (2006.01)
G06F 12/00 (2006.01)
G06F 17/30 (2006.01)

(52) U.S. Cl. .................. 382/305; 382/190; 382/195; 382/225; 382/306; 358/403; 707/826

(58) Field of Classification Search ................. 382/305
See application file for complete search history.

(56) References Cited

U.S. PATENT DOCUMENTS

| | | | |
|---|---|---|---|
| 6,246,793 B1 * | 6/2001 | Rindtorff et al. ............ | 382/174 |
| 6,562,077 B2 * | 5/2003 | Bobrow et al. .............. | 715/204 |
| 6,741,743 B2 * | 5/2004 | Stalcup et al. .............. | 382/217 |
| 6,768,816 B2 * | 7/2004 | Hall et al. ................... | 382/229 |
| 6,804,420 B2 * | 10/2004 | Uehara et al. ............... | 382/305 |
| 7,266,545 B2 * | 9/2007 | Bergman et al. .............. | 707/3 |

* cited by examiner

*Primary Examiner*—Matthew C Bella
*Assistant Examiner*—Jose M Torres
(74) *Attorney, Agent, or Firm*—Pauley Petersen & Erickson

(57) ABSTRACT

The invention enables the digital management of large scale image databases, to efficiently classify and index image data independent of language. Complex processing requirements are required only on reduced and operably small subsets of the entire collection, thereby effectively scaling large document collections. Embodiments of the present invention provide image-based classification and retrieval of documents based on image recognition, e.g., signatures, logos, stamps, or word-spotting; in documents within real time for large datasets such as in the millions of documents.

20 Claims, 4 Drawing Sheets

IMAGE-BASED INDEXING AND CLASSIFICATION IN IMAGE DATABASES

BACKGROUND OF THE INVENTION

1. Field of the Invention

The present invention addresses the problem of image-based indexing and classification in image databases. More particularly the present invention addresses the problem of indexing and classifying images, e.g., signatures, logos, stamps, or word spotting, i.e., word identification within an image; for search, analysis and retrieval in a document collection.

2. Discussion of the Related Art

Among the drawbacks in the known art of digital image databases, the identification of documents based on image similarity requires a composition of time consuming complex similarity measures. Further, the number of required similarity comparisons is proportional to the square of the number of documents in the database. Also, the known art does not address image-based classification of documents. Therefore, known techniques for the recognition of images are limited to a dataset of several thousand documents.

Thus, given a large collection of documents, e.g., such as those commonly related to legal investigations; and the task of obtaining those documents containing homolog images, such as signatures of a specific person, or containing a certain logo or stamp, or containing a certain handwritten word; these tasks are not possible with state of the art techniques. This is due to the complexity of image based similarity measures and the large number of comparisons that must be performed.

For example, in the application of signature-based document classification, documents must be characterized as signed by a certain individual; i.e., the application must classify documents according to signatures and index the documents accordingly. However, each time an individual signs a document, the signature will vary. As the exact image content of each homolog signature is unknown due to natural signature variation, current techniques need to measure the similarity of each signature to all others in the database, thus leading to a large number of comparisons, namely $O(N^2)$, i.e., the number of comparison operations to be performed is proportional to the number of documents squared.

Given that the number of documents, N, in the database of, for example, a legal investigation, may easily be in the millions, known techniques require a number of comparisons which is too computationally expensive, i.e., lengthy, to be of any practical value. Thus, image comparison databases are currently limited to only a few thousand documents.

There is therefore a need to provide for effective image-based digital database management of a realistically large number of documents, including especially a need to speedup the similarity determination and classification process.

SUMMARY OF THE INVENTION

The present invention provides means for meeting the above needs. The present invention is entirely image based and is language independent. Embodiments of the present invention are designed to reduce the average complexity of the required image comparisons by performing a sequence of simple comparisons for the majority of the images, and complete comparisons for only a small subsets thereof.

A method according to the present invention may operate within digital hardware software or firmware or combinations thereof, for efficient image-based indexing and classification of documents in digital image databases, and comprise the steps of selecting a representative image; quantifying features of the representative image; using a training set of similar type images to automatically establish a hierarchy of classifier parameters to be used as feature comparators; quantifying features of images in the database documents; and sorting the document image features using the established classifier parameters in cascaded comparisons to reduce a set of document images to an operably small set of candidate images for comparing to the representative image on a feature by feature basis.

As a general illustration, assume a database collection of e.g., one million digitized documents. The present invention uses cascaded comparisons for image classification, which may be suboptimal for exact image identification, but is entirely operable within the context of the present invention to significantly reduce the time needed for image comparisons. In this approach, instead of performing complex and time consuming similarity comparisons between a representative image and all the possible candidates in the database, as in the known art, the number of images which are candidates for retrieval is first reduced substantially using a cascaded sequence of efficient comparisons. Each comparison reduces the set of retrieval candidates until a small number L of candidates is obtained. Once the reduced set of candidates is obtained, accurate comparisons can proceed if desired according to the highly accurate but computationally expensive composite methods of the known art. Thus, instead of $O(N \times N)$ comparison operations, the present invention will employ only $O(N \times L)$ full comparisons where $L<N$.

By way of example, assume the searcher/operator of the attendant hardware, firmware, and software associated with the present invention, proposes to conduct a search of the documents in the digital image database to obtain a retrieval of all documents signed by one individual. Therefore, the search image within the image database is a signature in this example, although it will be understood that any image on a document may be a searchable image.

One of the first tasks is to quantify or characterize the signatures in the database documents by extracting values for the identifying features thereof. Remember that signatures from same individual are homologs, i.e., usually alike but almost never exactly so. The present invention will quantify the signatures by adaptively subdividing the signature images into component parts. A list of distinguishing characteristics, i.e., features can then be quantified and assembled into a list of comparison parameters contained within an identifying vector for the signature.

Using a training set of images with similar characteristics to the collection to be processed, in this case similar signatures, whether numerous iterations of the representative image or just a random set of cursive script signatures sufficient for training; the present invention will determine which comparison parameters are most discerning of, or discriminatory for the candidate selection algorithm, i.e., identifying those signatures which are candidates for retrieval on the stored documents within the database; i.e., those images which are closest to the representative signature during a comparison. The general principles and operation of training sets adequate for use with the present invention are considered within the skill of the art and will be discussed briefly below in conjunction with the exemplary embodiment.

If the images of the documents have not been previously quantified and classified, the search must start by assuming all documents in the database are originally candidates for containing a homolog of the representative/desired signature. Therefore, in comparing the representative signature to each document in the database, a search according to the present invention will operate a number of image comparisons in a cascaded fashion, e.g., recursively, and begin by going through the one million digitized documents, starting with the most efficacious discriminatory parameter of the identifying vector and proceeding with cascaded comparisons until a small subset of possible candidates is collected for more computationally intensive image analysis, if necessary.

The discriminating comparison parameter, or the list or order of the discriminating comparison parameters throughout the cascaded comparisons, need not be chosen to merely eliminate the most documents on the first comparison operation, but may be biased based upon many factors, such as load balancing, number of categories, an application specific selection that makes sense for a particular search query, etc. The person having ordinary skill in the art will appreciate that each successive comparison operation thus makes only 1/n comparison operations, where n is the number of bins in the comparison criteria. Thus, the number of comparison operations involved in an image based database search query according to the present invention is quickly reduced to a manageable level of operations, i.e., is computationally economical. For example, for a fifty-fifty/yes-no criteria, those candidates remaining after each operation are desirably one-half the number of the candidates in the previous comparison operation, assuming the identifying vector for each successive comparison operation is equally discriminating.

It will be appreciated that the images within the documents stored in the database may be classified and indexed prior to the search, e.g., upon input to the database. Alternatively, the images may be classified and indexed concurrently with the search operation.

Embodiments of the present invention may thus provide a practical image-based classification of documents by pre-selecting candidates for a more intensive image comparison by using cascaded comparisons. In this way, the number of signatures that are needed to be compared using complex similarity measures is significantly reduced. Thus, a method of image-based classification of documents, and their retrieval, is made practical within real-time constraints for collections measuring in the millions of documents.

The exemplary description of the present invention focuses on the problem of classifying document images based on signature similarity. However, the person having ordinary skill in the art will appreciate that the entirety of the invention is image based, not language based, and therefore the described operations are equally adaptable to any image that may appear in a document. Thus, embodiments of the present invention can be used similarly for classifying document images based on logos, based on stamps, or based on image-based word spotting i.e., words treated as an image, initials, etc. The method of the present invention is language independent. Therefore, the present invention may equally characterize such diverse scripts as Latin script, Arabic, Farsi, Pashto, Urdu, Dari, Hindi, Tamil, Japanese, Chinese, Korean, Thai, Hebrew, and Greek.

The approach of the present invention for indexing and classification in image databases enables a wide range of applications such as: retrieving documents from image databases based on the similarity of signatures and/or logos and/or stamps and/or spotted word or words to entities in a query document; determining the number of unique authors and/or organizations in image databases by clustering the data based on signatures and/or logos and/or stamps, and/or spotted word or words, and counting the number of clusters; determining the most frequent signer and/or organization in image databases to hint at authority level and organization importance by clustering the data based on signatures and/or logos and/or stamps, and/or spotted word or words, and determining the frequency of each signature and/or logo and/or stamp and/or spotted word or words; comparing a signature to a clustered group of signatures to detect forgery in image databases by clustering the data based on signatures, determining the corresponding cluster, and measuring the similarity between the query signature and each signature in the corresponding cluster; and determining the regularity of signatures of the same person in image databases to detect stamped signatures by clustering the data based on signatures and measuring the similarity within each cluster.

BRIEF DESCRIPTION OF THE DRAWINGS

The aspects of this invention will be better understood from the following detailed description taken in conjunction with the drawings wherein.

DETAILED DESCRIPTION OF THE PREFERRED EMBODIMENT

Figure 1:
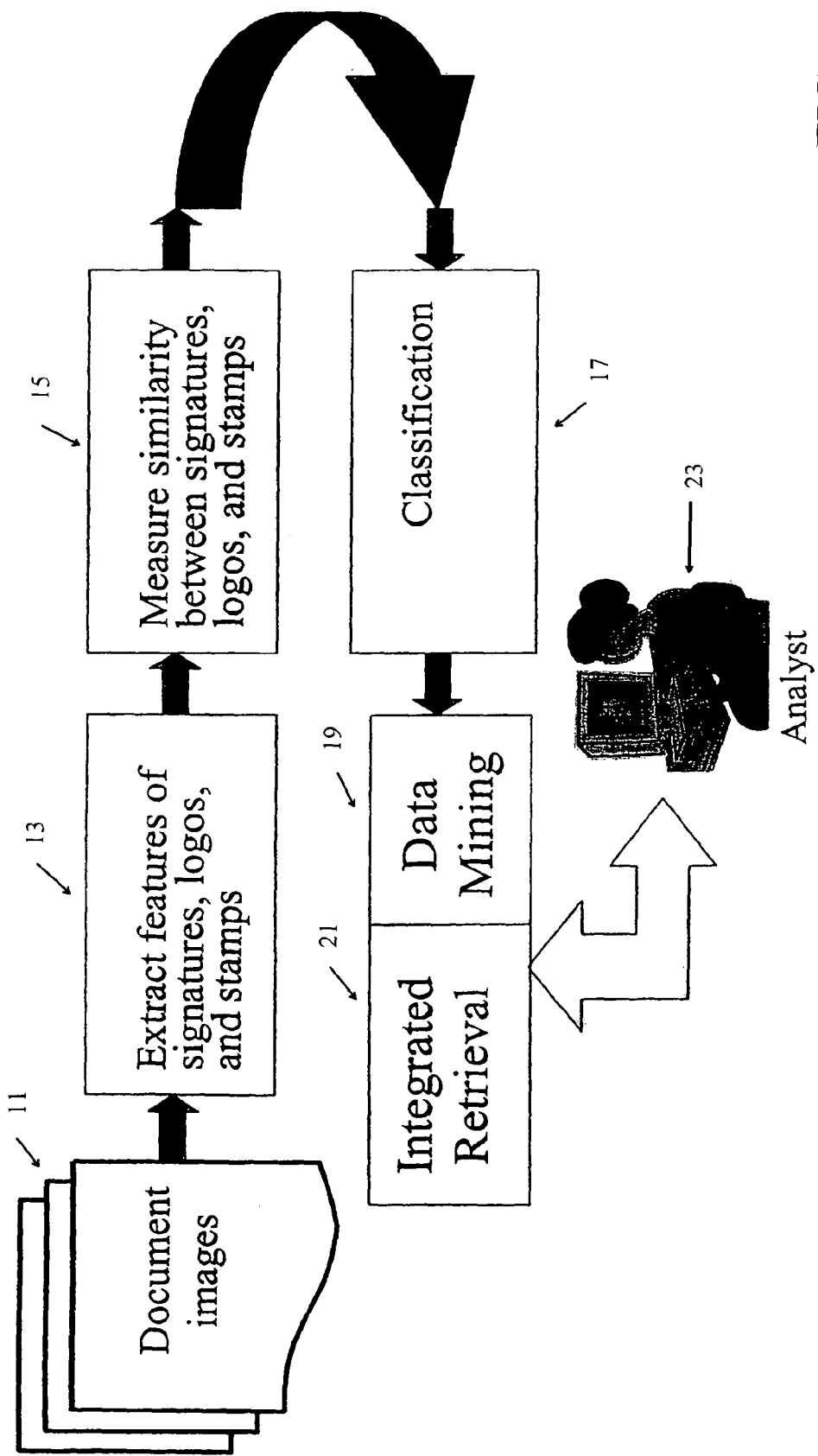
FIG. 1 illustrates a general overview of the invention.

As seen in FIG. 1, an overview of the system of the present invention includes a database of digitized document images 11. The documents 11 are processed 13 to extract the identifying features of their image units, such as signatures, logos, stamps, spotted word or words, etc. Once images features are extracted, quick and simple comparisons 15 measuring similarity between images can be done to reduce the set of retrieval candidates to a manageable number, and the images can be classified and indexed 17. Data mining 19 and integrated retrieval 21 of relevant information can then be requested from the system by an analyst/operator 23. An exemplary embodiment will be discussed below with reference to a signature being the search image, which illustrates the various operating principles of the present invention. The person having ordinary skill in the art will appreciate that the invention is not limited to the exemplary embodiment or search image and can be applied to any image on a document.

Classifying documents based on image similarity requires the comparison of images in the documents such as signatures. Such comparisons require an identifying vector to be assembled for the features extracted from each signature. For example, the present invention can obtain a number of components in the signature and the angle of each component. The feature extraction process involves both spatial ambiguity and feature inaccuracy. For example, assume that there is a distinct stroke in the center of a signature that could be used to identify it. Due to natural variation in handwriting, this feature may appear off center, and so, will not correlate to other instances of the same signature. Additionally, assume that the present invention uses the angle of this stroke for comparing signatures. Due to noise and natural variations, it is likely that this angle will not be identical to the angle of the same stroke in other instances of the same signature. Due to these reasons, image-based similarity comparison is a complex process that is time consuming.

Feature Extraction

To support the exemplary embodiment, there is a need to extract shape features, or perhaps more literally values therefore, that can represent each signature. These shape features need to capture distinct characteristics of the signatures to allow for discrimination between them. The shape features should also be general enough to capture natural variations in the signatures of the same person. These are two conflicting requirements of specificity and generality that should be settled through trade off. The shape features used in the present approach include both local and global features. Global features are computed for the complete signature whereas local features are computed at different locations of the signatures. The use of local features is intended to form a spatial characterization of signatures.

Figure 2:
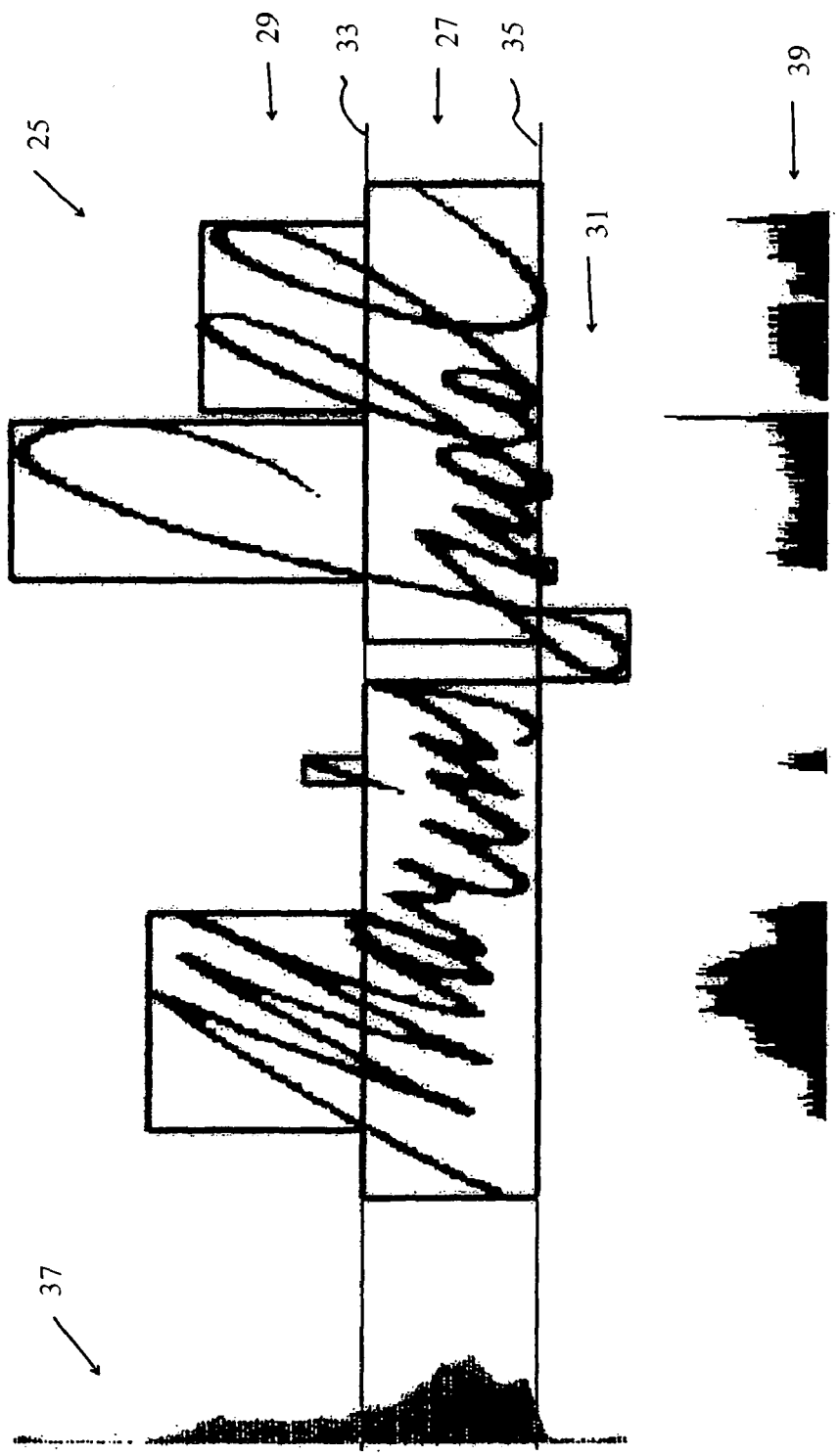
FIG. 2 through FIG. 4 illustrate feature extraction from a signature image.

Referring to FIG. 2, specifically, a signature 25 can be normalized and decomposed into three horizontal bands 27, 29, 31 containing the baseline of the signature, top protrusions (containing ascenders), and bottom protrusions (containing descenders), respectively. Normalization in the context of the present invention indicates that the signature images are brought to a standard position before computing their features. The standard position is a position in which the signature is aligned with the horizontal axis, its center of mass is located at the origin, and the size of the long side of the bounding box containing it is 1. For example, the signature of a person may be rotated, and this may affect the computation of the features. The normalization in such a case would be to rotate the signature so that it is horizontal. More generally, the transformation needed to bring an arbitrary signature to a standard position, i.e. normalization, is composed of a combination of rotation, translation, and scale transformations.

Figure 3:
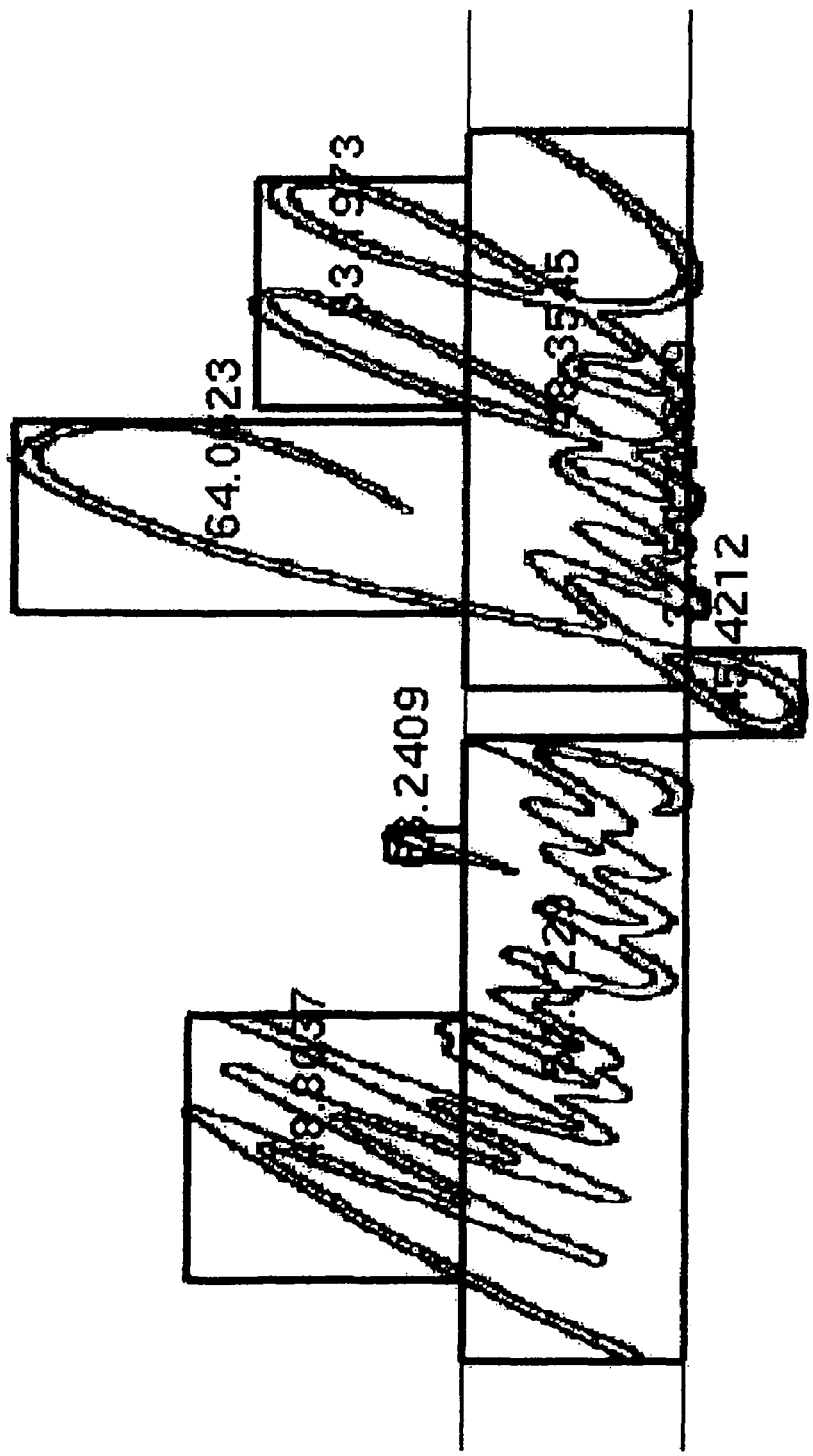
Figure 4:
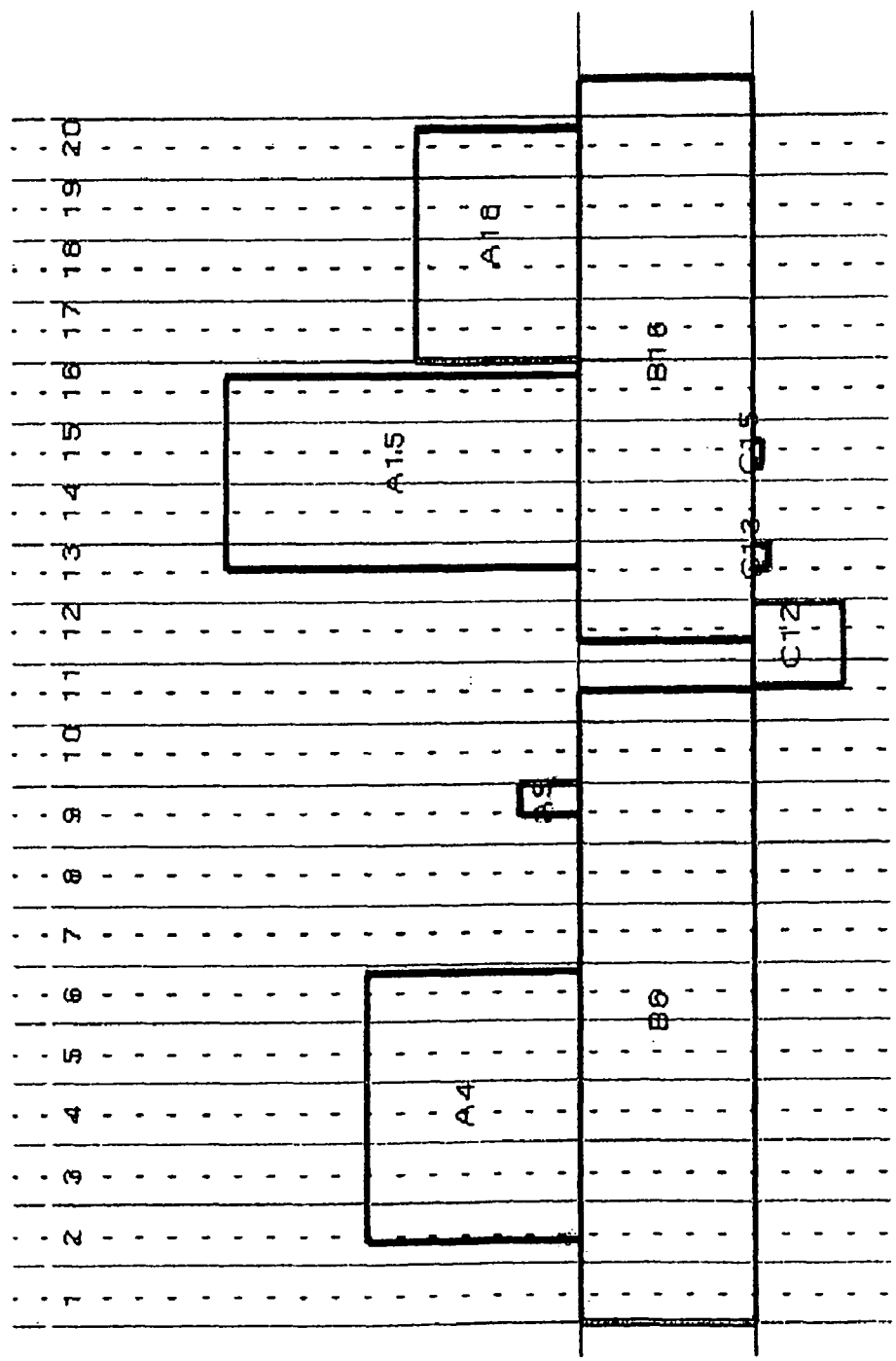

The two boundary lines 33, 35 that separate the baseline from the top and bottom protrusions are obtained using a vertical projection histogram 37 of the binarized signature. Given the three horizontal bands, each band is then segmented based on a horizontal projection histogram 39 of it. FIG. 3 illustrates the characterization of zones in the signature. Boundaries of zones are set at locations where the horizontal projection is empty. In this way each of the obtained zones represent a connected component describing a local part of the signature. Hence, computed features for each zone will describe local parts of the signature. An alternative to the adaptive zoning approach is to divide the signature into a fixed number of rectangular zones (e.g. 8) so that each zone contains roughly the same number of black pixels. Here, again, the features computed at each zone will characterize a local part of the signature. FIG. 4 illustrates a spatial labeling of the features of the signature. Other various known techniques may be adapted to feature extraction within the spirit of the present invention.

Candidate Signature Selection

The proposed classification scheme is based on an efficient way for to greatly reduce the number of candidates selected for in-depth similarity comparisons, by using cascaded series of comparisons. Cascaded comparisons are used to refine the candidate set. A signature is kept in the candidate set only if its feature value is within an acceptable distance from the corresponding feature value of the representative signature. In spatial features, the condition may be satisfied at neighboring locations.

Candidate signature selection in the exemplary embodiment uses four classifier parameters for the image features: a feature-type classifier parameter, a feature importance classifier parameter, a feature variation classifier parameter, and a spatial variation classifier parameter.

Given a set of N signatures the present invention computes an identifying vector $F_i$ for each signature, where each identifying vector contains a number of feature or image characterizing elements used as classifier parameters for the image.

Given a representative signature with an identifying vector Q, the present invention attempts to find all the signatures having an $F_i$ that could be corresponding to Q.

The inputs to the candidate selection algorithm of the present embodiment are four classifier parameters ($\Psi, \Omega, \Sigma_f$, and $\Sigma_s$). The classifier parameter $\Psi$ describes whether the corresponding features are local within a segment or globally describe the image. The classifier parameter $\Omega$ contains the importance of the different features (e.g., curvature of lines). The classifier parameter $\Sigma_f$ determines the allowed variation in feature values. The classifier parameter $\Sigma_s$ contains allowed spatial variation for location with the image field. The classifier parameter $\Psi$ is set manually, whereas the classifier parameters $\Omega, \Sigma_f,$ and $\Sigma_s$, are estimated directly from a training dataset as described later.

The classification process is based on cascaded comparisons using the classifier parameters in which the set of signatures identified as candidates for full analysis of their homolog status is refined and reduced to a workable (operable) number. In this comparison, a signature is kept in the candidate set only if its classifier parameter value is within an acceptable distance from the corresponding classifier parameter value in the representative signature. If the k-th feature is spatial, it is sufficient that the condition is satisfied in any neighboring feature locations within a distance of $\Sigma_s(k)$ from k provided that such locations have the same spatial label $\Psi(k)$. That is, a signature is kept in the candidate set only if the following condition is satisfied:

$$\#\{j \in [k-\Sigma_s(k), k+\Sigma_s(k)] | \Psi(j)=\Psi(k)^\wedge F_i(j) \in [Q(k)-\Sigma_f(k), Q(k)+\Sigma_f(k)]\} \neq \emptyset \quad (1)$$

where # denotes the cardinality of a set. Note that smaller components have a larger ambiguity in their position. To account for this larger ambiguity, it is possible to multiply $\Sigma_s(k)$ by a weight function w(l) that produces higher weight values for smaller box length values l.

Automated Parameter Variance Estimation

A training dataset is used to set the basis for the cascaded comparisons by computing feature variability, computing spatial variability, and by computing feature importance. A feature is more important if the entropy impurity reduction corresponding to the feature is higher.

The candidate selection algorithm, as described before, depends on the determination of three classifier parameters: $\Omega, \Sigma_f$ and $\Sigma_s$. The values of these classifier parameters are estimated directly based on a training dataset. In this dataset, signatures are grouped into subsets $S_i$ such that each subset contains the signatures of the same person.

Addressing the computation of the elements of the parameter $\Sigma_s$; the elements of this parameter corresponding to non-spatial features are set to 0. The elements corresponding to spatial features are computed based on the estimated variance in the horizontal position of signature components. Three average variance values $\{\sigma^b\}_{b=1}^3$ are computed, one for each of the horizontal signature bands. The computed average for a band is then used to set all the elements of $\Sigma_s$ corresponding to spatial features in the band. The value set in $\Sigma_s$ for band b is given by $\alpha\sqrt{\sigma^b}$, where $\alpha$ is a constant factor (e.g., set to 2).

To compute the average horizontal position variance in a given band, the present invention will first compute the horizontal position variance for signatures in each subset $S_i$ and then average it over all the subsets $S_i$. The horizontal position of each signature component is determined based on the horizontal position of its center of mass. The horizontal position variance of band b in the subset $S_i$ is computed by selecting the majority of the signatures in this subset that have the same number of components in this band. Let $\{p_j^k\}_{j=1}^J$ be the set of horizontal component positions in band b, where J is the number of components, k is the index of a signature in the given subset, and K is the total number of signatures in this subset. The horizontal position variance is given by:

$$\sigma_i^b = \frac{1}{JK} \sum_{j=1}^{J} \sum_{k=1}^{K} (p_j^k - \overline{p}_j)^2 \qquad (2)$$

where $$\overline{p}_j = \frac{1}{K} \sum_{k=1}^{K} p_j^k.$$

The average band variance $\sigma^b$ is then given by $$\sigma^b = \frac{1}{I} \sum_{i=1}^{I} \sigma_i^b$$

where I is the total number of signature subsets in the training data.

The computation of the elements of the classifier parameter $\Sigma_f$ is done in a similar way to the computation of the elements of $\Sigma_s$ when substituting the horizontal position values $p_j^k$ with feature values. That is, the average variance of a given feature is computed per horizontal signature band and used to set all the entries in $\Sigma_f$ corresponding to the given feature and band. The value set in $\Sigma_f$ for band b and feature f is given by $\beta\sqrt{\sigma^{b,f}}$, where $\beta$ is a constant factor, e.g. 2, and $\sigma^{b,f}$ is the average variance of the feature f in band b.

The computation of the classifier parameter $\Omega$ is done using the training dataset and the estimated classifier parameters $\Sigma_f$ and $\Sigma_s$. Given the j-th signature in the subset $S_i$, and a feature f, a classification is performed using the classification scheme described before. The classification is performed into two sets: a set containing signatures of the subset $S_i$, and a set containing all the other signatures in the dataset. The set containing the signatures of the subset $S_i$ is obtained using the similarity to the f-th feature of the j-signature in $S_i$.

The quality of this classification $\lambda_{i,j}^f$ is measured by the entropy impurity reduction given by:

$$\lambda_{i,j}^f = I(\Gamma_T) - \frac{\#\Gamma_1}{\#\Gamma_T} I(\Gamma_1) - \frac{\#\Gamma_2}{\#\Gamma_T} I(\Gamma_2) \qquad (3)$$

where I(X) is the entropy impurity measure of the set X, $\Gamma_T$ is the set of all signatures in all the subsets, $\Gamma_1$ is the set of signatures classified as belonging to the subset $S_i$, and $\Gamma_2$ is the set of signatures classified as not belonging to the subset $S_i$. Higher entropy impurity reduction indicates a better classification. The entropy impurity measure I(X) of the set X is defined by:

$$I(X) = -\sum_{k=1}^{2} P(\omega_k) \log_2 P(\omega_k) \qquad (4)$$

where $P(\omega_k)$ is the fraction of the signatures in X that are in the k-th class (class 1 is the class of signatures classified as belonging to the subset $S_i$ and class 2 is the class of signatures classified as not belonging to the subset $S_i$). Note that since this is a two-class problem, the present invention has $P(\omega_2) = 1 - P(\omega_1)$. Using the entropy impurity reduction measure $\lambda_{i,j}^f$ the present invention can compute the average entropy impurity reduction for feature f by:

$$\lambda^f = \frac{1}{G \cdot \#S_i} \sum_{i=1}^{G} \sum_{j=1}^{\#S_i} \lambda_{i,j}^f,$$

where G is the number of subsets $S_i$. Using the average entropy impurity reduction $\lambda^f$, the order parameter $\Omega$ is constructed so that the indexes of features with a higher entropy impurity reduction measure are placed before the indexes of features with a lower entropy impurity reduction measure. The entropy impurity reduction is measured at each step so that features correlated to selected features are not ranked high.

The entropy impurity measure used in the present approach is commonly used in the formation of other known decision tree classifiers. Other measures that are used in such classifiers and can be used in the present algorithm include known variance impurity and misclassification impurity measures. Despite this similarity of techniques, it will be noted that the proposed algorithm is not a decision tree classifier.

The present invention thus solves problems of classifying document images based on image similarity. The proposed approach can be used for classifying document images based on signatures, logos, on stamps, or image-based word spotting. Accurately classifying documents based on image similarity ultimately requires complex similarity measures that are time consuming. Furthermore, within a document collection, the number of required similarity comparisons is proportional to the square of the number of documents in the database. To allow for image-based classification of documents, there has been shown a method to speedup the similarity determination process. This is done by pre-selecting images as candidates for final comparison by using cascaded simple and quick comparisons. In this way the number of images that are needed to be compared using complex similarity measures is significantly reduced. The parameters of the cascaded comparisons are determined automatically using a training data set that need not include all the images of the representative type in the database. The classification scheme of the present invention has numerous possible information retrieval applications such as retrieving documents based on image similarity, clustering documents based on image similarity, determining the number of authors in a dataset, and determining author-based frequency of documents.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for efficient image-based indexing and classification in an image database using digital hardware, software or firmware or combinations thereof, the method comprising:

selecting one or more representative images;

identifying features of the one or more representative images;

defining classifier parameters from the identified features, wherein defining classifier parameters from the identified features comprises: determining the discrimination ability of each feature; determining the variance of each feature; and determining the spatial variance of components;

comparing the classifier parameters to at least a plurality of document images within the image database to obtain a reduced set of candidate images selected from the at least a plurality of document images; and indexing or classifying the reduced set of candidate images.

2. The method of claim 1, further comprising using a training set of more than one similar type of representative images to automatically establish a hierarchy of classifier parameters to be used as feature comparators.

3. The method of claim 1, further comprising sorting image features of the at least a plurality of document images using the defined classifier parameters in cascaded comparisons to obtain the reduced set of candidate images.

4. The method of claim 1, further comprising comparing the reduced set of candidate images to the one or more representative images on a feature by feature basis.

5. The method of claim 1, wherein identifying features of the one or more representative images comprises:
normalizing the images;
adaptively subdividing the images into components;
computing local features for each component; and
obtaining a spatial labeling for each component.

6. The method of claim 1, further comprising:
extracting feature vectors from the one or more representative images;
using the feature vectors for automatically establishing the classifier parameters; and
using the established classifier parameters in a series of cascaded comparisons to obtain the reduced set of candidate images.

7. The method of claim 6, wherein extracting normalized feature vectors comprises:
normalizing the image;
adaptively subdividing the image into components;
computing local features for each component; and
obtaining a spatial labeling for each component.

8. The method of claim 1, further comprising using a sequence of feature value comparisons between the one or more representative images based upon the classifier parameters.

9. The method of claim 1, further comprising indexing and classification of at least one of signature-based, logo-based, stamp-based, or word spotting based, in image databases.

10. The method of claim 1, further including the step of retrieving documents having an image similar to a query image.

11. The method of claim 1, further comprising determining at least one of a number of unique authors and organizations in an image database, by clustering data based on at least one of signatures or logos or stamps; and counting the number of clusters.

12. The method of claim 1, further comprising determining at least one of a most frequent signer and organization in an image database to imply an authority level or organization importance; by clustering data based on at least one of signatures or logos or stamps; and determining a frequency of at least one of each signature or logo or stamp.

13. The method of claim 1, further comprising comparing a query signature to a clustered group of signatures to detect forgery in image databases, by clustering the data based on signatures; determining the corresponding cluster; and measuring the similarity between the query signature and each signature in the corresponding cluster.

14. The method of claim 1, further comprising determining the regularity of signatures of the same person in image databases to detect stamped signatures, by clustering the document images based on the signatures; and measuring the similarity within each cluster.

15. The method of claim 1, used for determining the relevance of images in any form of writing script.

16. A method for efficient image-based indexing and classification in an image database using digital hardware, software or firmware or combinations thereof, the method comprising:
selecting one or more representative images;
identifying and extracting feature vectors of the one or more representative images;
automatically defining classifier parameters from the identified and extracted feature vectors;
comparing the classifier parameters to at least a plurality of document images within the image database in a series of cascaded comparisons to obtain a reduced set of candidate images selected from the at least a plurality of document images, wherein the series of cascaded comparisons comprises: using a sequence of feature comparisons; incorporating feature variance into the comparisons; and incorporating spatial variance into the comparisons; and
indexing or classifying the reduced set of candidate images.

17. The method of Claim 16, wherein defining classifier parameters from the identified features comprises:
determining the discrimination ability of each feature;
determining the variance of each feature; and
determining the spatial variance of components.

18. A method for efficient image-based indexing and classification in an image database using digital hardware, software or firmware or combinations thereof, the method comprising:
selecting one or more representative images;
identifying features of the one or more representative images;
defining classifier parameters from the identified features;
comparing the classifier parameters to at least a plurality of document images within the image database to obtain a reduced set of candidate images selected from the at least a plurality of document images by using a sequence of feature value comparisons between the one or more representative images based upon the classifier parameters and incorporating at least one of feature variance or spatial variance into the feature value comparisons; and
indexing or classifying the reduced set of candidate images.

19. The method of claim 18, wherein the step of defining classifier parameters additionally comprises: determining the discrimination ability of each feature; determining the variance of each feature; and determining the spatial variance of components.

20. A method for efficient image-based indexing and classification in image databases, the method comprising:
a) extracting feature values from the images by:
normalizing the images;
adaptively subdividing the images into components;
computing local features for each component; and
obtaining a spatial labeling for each component;
b) using the feature values to automatically estimate classifier parameters by:
determining the discrimination ability of each feature;
determining the variance of each feature; and
determining the spatial variance of components;

c) using the classifier parameters in a series of cascaded comparisons with the images within the image database to obtain a reduced set of images by:
   using a sequence of feature value comparisons between a representative image and the images based upon the classifier parameters;
   incorporating feature variance into the comparisons; and
   incorporating spatial variance into the comparisons; and
d) indexing and classifying the reduced set of images.

* * * * *